Feb. 2, 1965  H. E. KLINGLER  3,168,109
DOMESTIC WATER MIXING AND DIVERTING VALVE ASSEMBLY
Filed Jan. 29, 1962  3 Sheets-Sheet 2
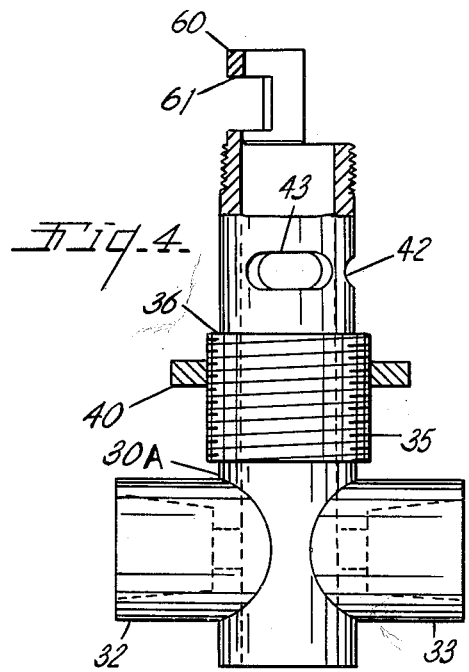
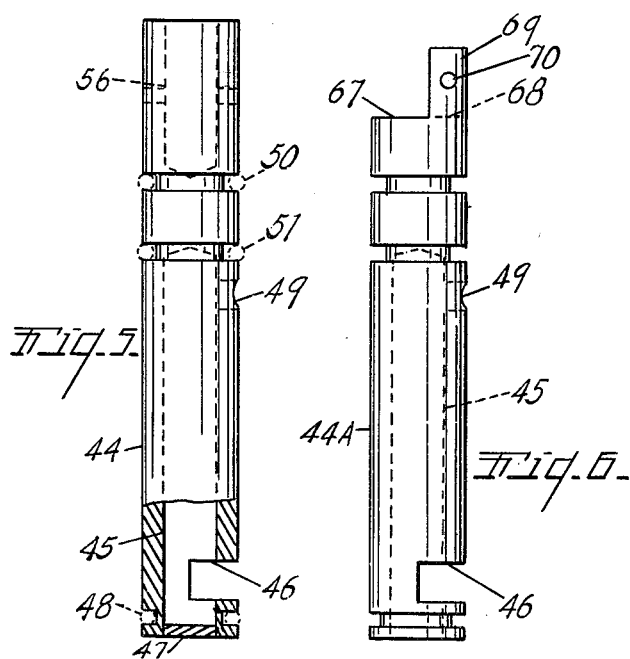
INVENTOR.
Hughlin E. Klingler
BY
ATTORNEY Feb. 2, 1965   H. E. KLINGLER   3,168,109
DOMESTIC WATER MIXING AND DIVERTING VALVE ASSEMBLY
Filed Jan. 29, 1962   3 Sheets-Sheet 3

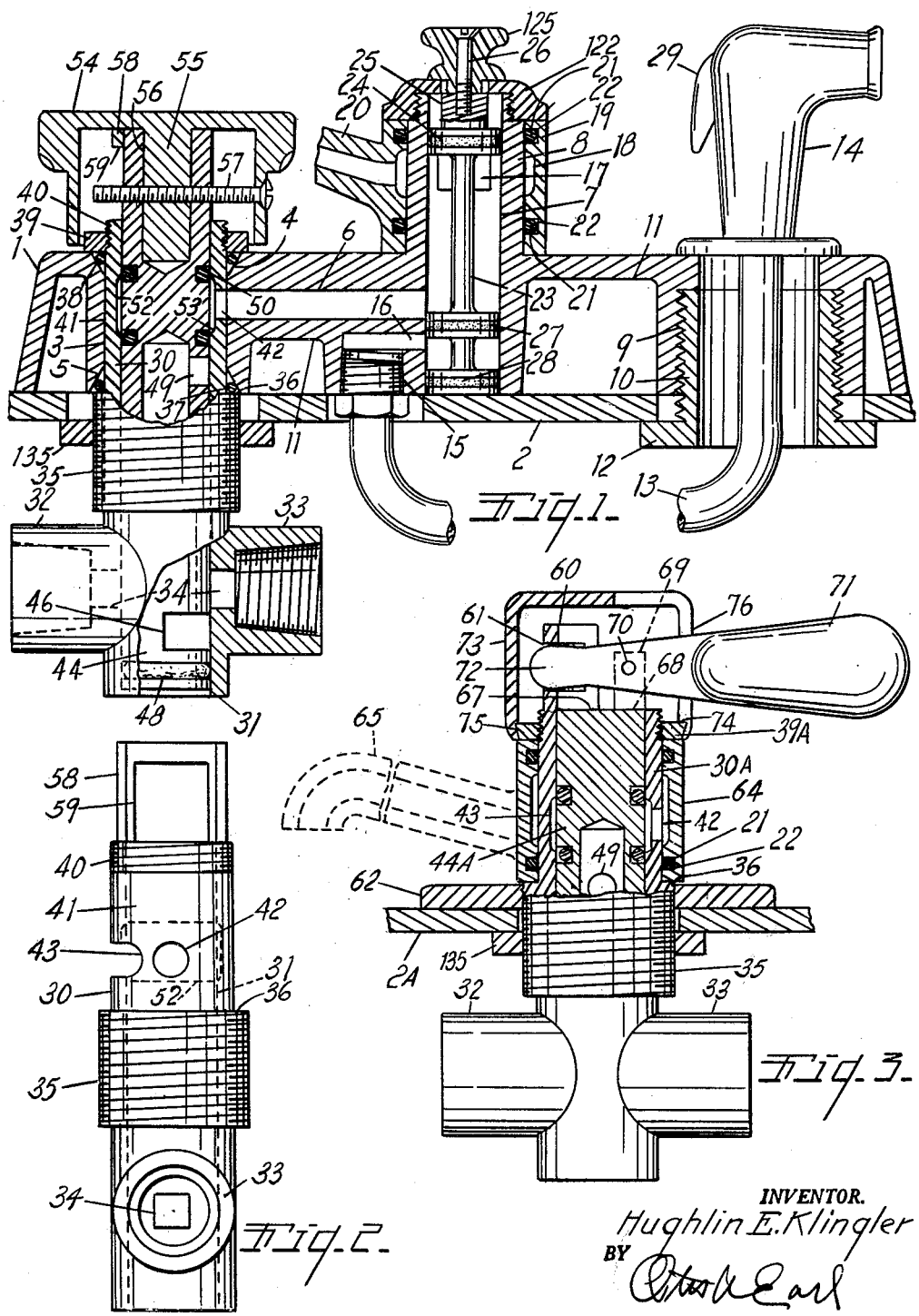

INVENTOR.
Hughlin E. Klingler
BY
Otto A. Earl
ATTORNEY.

United States Patent Office 3,168,109
Patented Feb. 2, 1965

3,168,109
DOMESTIC WATER MIXING AND DIVERTING
VALVE ASSEMBLY
Hughlin E. Klingler, 223 Arcade Ave., Elkhart, Ind.
Filed Jan. 29, 1962, Ser. No. 169,551
16 Claims. (Cl. 137—597)

This invention relates to improvements in domestic water mixing and diverting valve assembly. The principal objects of this invention are:

First, to provide a novel form of valve and faucet for regulating the volume and mixture of hot and cold water which can be mounted alternatively as a simple faucet with a swing spout or as part of a fixture with a diverter valve to a separate spray nozzle.

Second, to provide a novel or mixing valve which can be economically manufactured and which utilizes long wearing O-ring seals as the primary shut-off elements of the valve so that faucets embodying the valve require little maintenance.

Third, to provide a novel form of mixing and shut-off valve which can be actuated by simple manual push-pull and rotary movement of the valve.

Third, to provide a plumbing fixture in the form of a mounting base for a mixing valve and diverter valve which can be used alternatively for a single faucet and spray mounting or as a tub faucet and shower diverter valve.

Fourth, to provide a novel form of valve body and core with a modified form of operating connection between the two in which a simple lever reciprocates and rotates the core in the valve body.

Fifth, to provide plumbing faucet and valve fixtures, the elements of which are easily and inexpensively manufactured to high degrees of accuracy for effective seals and long life.

Other objects and advantages of the invention will be apparent from a consideration of the following description and claims.

The drawings, of which there are three sheets, illustrate a highly practical form of the faucet and valve arranged in combination with a diverter valve to a spray nozzle for use on kitchen sinks and an alternative adaptation of the faucet and valve as a separate swing faucet. The drawings also illustrate a modified adaptation of the faucet and diverter valve for tub and shower use and a modified form of the mixing and shut-off valve specifically adapted for regulating a shower.

FIG. 1 is a fragmentary vertical cross sectional view through a plumbing fixture for a kitchen sink showing a first form of the mixing and shut-off valve associated with a diverter valve connected to a spray nozzle on a flexible hose.

FIG. 2 is a side elevational view of the valve body used in FIG. 1.

FIG. 3 is a fragmentary vertical cross sectional view of a mixing valve and faucet mounted for independent use and embodying a modified form of lever operating mechanism for the valve.

FIG. 4 is a side elevational view partially in vertical cross section of the valve body shown in FIG. 3.

FIG. 5 is an elevational view partially broken away in cross section of the valve core shown in FIG. 1 cooperative with the valve body in FIG. 2.

FIG. 6 is an elevational view of a modified form of the valve core as used in the faucet and valve body of FIGS. 3 and 4.

Figure 7:
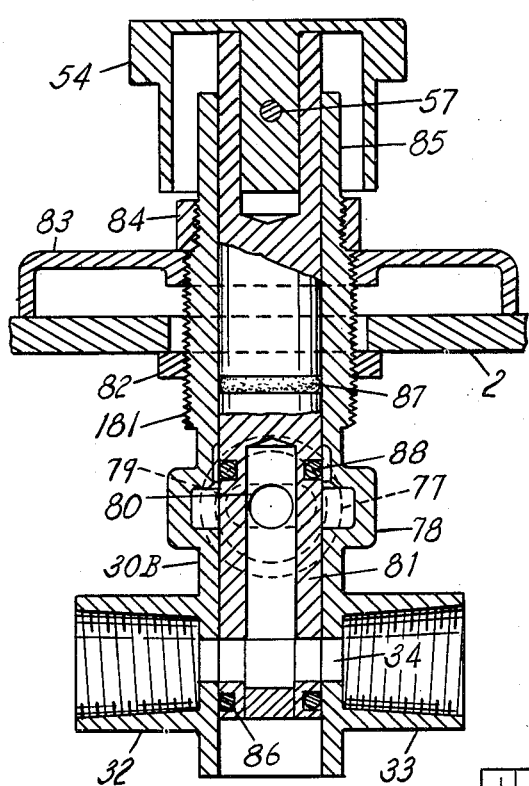
FIG. 7 is a fragmentary cross sectional view taken axially through a second modified form of the valve body and core especially adapted for use as a shower regulator.

The mixing and shut-off valve of this invention constitutes an improvement of the somewhat similar valve and faucet disclosed in my copending application, Serial No. 825,127, filed July 6, 1959 for Water Faucet Construction, now Patent No. 3,026,907, March 27, 1962. As is indicated in the objects stated above it is one feature of the present valve that it can be used in various relationships thus reducing the number of different parts which must be manufactured to meet different requirements.

FIG. 1 illustrates a plumbing fixture primarily for use on kitchen sinks and FIGS. 2 and 5 illustrate parts of the fixture. The reference numeral 1 represents a mounting base which can conveniently be formed as a die casting and provided with a decorative chromium finish. The bottom of the casting is flat to rest upon the rim 2 of a sink. The base 1 defines a first cylindrical bore 3 with tapered seats 4 and 5 at each end. Intermediate of its ends the bore 3 communicates with a passage 6 extending laterally to a central diverter bore 7. The bore 7 opens to the bottom of the casting and extends upwardly through a cylindrical neck 8 formed on the top surface of the casting. At its other side the casting 1 defines an internally threaded bore 9 adapted to receive the tubular nipple 10. Suitable cavities 11—11 may be formed in the casting around the walls forming the bores to reduce the weight of the casting and save metal.

The flange 12 on the nipple 10 acts as a retaining clamp on the underside of the sink flange 2 and the nipple and bore 9 form a passage for the flexible hose 13 extending to a spray nozzle 14 which rests against the top of the casting when not in use. The other end of the hose 13 is connected underneath the sink of the port 15 formed in the bottom of the casting alongside of the diverter bore 7. The wall of the bore 7 is cut away into the port 15 as at 16. Near the upper end of the bore 7 of the cylindrical neck 8 an annular flow passage 18 is formed in the circular base 19 of a swing faucet 20. O-ring seals 21 mounted in internal grooves 22 in the ends of the circular base 19 seal the faucet above and below the annular flow passage 18. The upper end of the neck 8 is threaded to receive the cap nut 122 which retains the swing faucet on the neck.

Water flow through the bore 7 and between the faucet port 17 and spray nozzle port 16 is controlled selectively by a reciprocable spool valve 23. The valve 23 has an upper collar and O-ring 24 which at all times slide within the bore 7 above the port 17 to prevent leakage from the top of the bore. A drilled and tapped neck 25 on the upper end of the spool projects through a hole provided therefor in the cap nut 122 and is connected to the operating knob 125 by a screw 26. Near its lower end the spool valve 23 is provided with axially spaced collars and O-rings 27 and 28 and in the downward or inward position of the valve, the collar and seal 27 are positioned between the passage 6 and the opening 16 to the spray nozzle port 15. In this position all water delivered through the passage 6 will be directed to the spout 20 which as noted can be swung angularly around the neck 8. The O-ring seal 28 at all times seals the lower end of the bore 7 and prevents leakage therethrough. When the knob 125 and valve 23 are pulled upwardly or outwardly from the body, the collar and seal 27 move to the opposite side of the passage 6 and permit and require the flow of all water from the passage 6 to the spray nozzle 14. If desired the spray nozzle 14 may be provided with a further valve 29 to prevent accidental discharge of the spray before the user has moved the hose and nozzle to the desired position.

The bore 3 in the left side of the casting receives the mixing and shut-off valve of the invention which consists of a tubular body 30 shown most clearly in FIG. 2. The body 30 defines a single continuous internal bore 31 and is provided on its lower end with oppositely projecting arms 32 and 33 for connection to hot and cold water supply pipes which open oppositely into the bore 31 through rectangular ports 34. Above the projecting connections 32 and 33 the exterior of the valve body is externally threaded as at 35 with an upwardly facing shoulder 36 at the upper end of the threaded portion. The shoulder 36 clamps an O-ring seal 37 against the lower tapered seat 5 on the base while an upper O-ring seal 38 is clamped against the upper tapered seat 4 by a hold down nut 39 threaded on the threads 40 at the upper end of the body 30. The threads 35 receive a clamp nut 135 which engages the underside of the sink flange and cooperates with the head of the nipple 10 in holding the fixture in place on the sink.

Between the shoulder 36 and the threads 40 the body 30 has a cylindrical exterior surface 41 closely fitting the bore 3 in the mounting fixture. The cylindrical portion 41 defines a first circular transfer port 42 registering with the passage 6 in the base. The cylindrical portion also defines an arcuate elongated port 43 which performs no function in this mounting of the valve but which is utilized in other mountings as will be described. It will be noted that the O-ring seals 37 and 38 seal around the valve body above and below the ports 42 and 43 so there can be no leakage along the outside of the valve body.

Flow of water in the desired volumes and proportions from the inlet ports 34 is controlled and regulated by a cylindrical valve core 44 shown more clearly in FIG. 5. The core fits closely but slidably within the cylindrical bore 31 of the valve body and has a central axial flow passage 45 formed in its lower end communicating with a transverse slot 46 cut half way through the core. A plug 47 permanently closes the lower end of the passage 45 after the passage is formed and an O-ring seal 48 carried around the lower end of the core is at all times sealed around the lower end of the bore 31 below the ports 34. Midway of its length the core 44 is provided with a laterally opening delivery port 49 opening from the passage 45. A pair of spaced O-ring seals 50 and 51 are mounted in grooves in the core above the port 49. The port 49 is positioned to register with the port 42 when the lower slot 46 registers with one or both of the passages 34 to the supply connections. Desirably the interior of the valve body 30 is annularly enlarged as at 52 with smoothly tapered edges 53 to permit smooth passage of the lower seal 51 into the enlarged area and past the port 42. The O-ring seal 50 at all times remains in the upper cylindrical portion of the bore 31 and prevents leakage through the top of the valve body.

It will be evident that rotation of the core 44 will present the diametrical slot 46 selectively into registry with either of the passages 34 from the hot or cold supply connections and that by rotation of the core hot water can be admitted to the exclusion of cold water and vice versa. Axial movement of the core 44 regulates the size of the selected admission passage between zero and full flow. At the same time opening either of the passages 34 opens the port 49 and delivers water to the passage 6 in the base.

Movement of the core 44 within the valve body is regulated by a chambered cap or knob 54 having a stud 55 projecting downwardly into a bore 56 formed in the upper end of the core. The knob is retained on the core by a screw 57 passed through the skirt of the knob and the top of the core and the stud 55. The screw 57 performs the additional function of regulating the extent of movement of the knob and the valve core. For this purpose the valve body 30 is provided with a semi-circular extension 58 on its upper end with an arcuate opening 59 therein which receives the projecting inner end of the screw 57 when the screw is fully inserted into the knob. The engagement of the inner end of the screw with the inner periphery of the opening 59 limits both angular and axial movement of the core and the knob.

As stated in the objects, the O-ring seals 48, 50 and 51 are extremely long lived since they are subjected to little friction, but should it be necessary to replace one or more of these seals the repair is easily accomplished by backing out the screw 57 until it clears the opening 59 at which time the knob 54 and core 44 can be removed from the valve body.

FIGS. 3, 4 and 6 illustrate a modified form of the valve mounted as an independent mixing faucet with swing spout and with a lever as an operating element in place of the knob 54. The valve body 30 is the same in all respects as the body shown in FIGS. 1 and 2 except that the arcuate segmental wall 60 at the upper end of the tubular body of the valve is somewhat shorter and the rectangular opening 61 is more like an angular elongated slot. The body 30 is provided with the same supply connections 32 and 33 and an adjacent threaded portion 35 with the lower clamp nut 135 thereon. In this faucet installation the threaded portion 35 also engages and is supported by a third nut in the form of a finished escutcheon ring 62 in opposition to the clamp nut 135 for clamping the valve element to the sink panel 2A.

The radial shoulder 36 acts as an abutment for the lower part of the cylindrical end 64 of a swing faucet 65. The upper end of the cylindrical end 64 is held in place by a similar clamp nut 39A on the upper end of the tubular body element. The faucet 65 and its cylindrical end 64 may be the same size as the base 19 on faucet 20 in FIG. 1 and has the same O-ring seals 21 mounted in grooves 22.

The valve core 44A is the same as to its interior construction as the core 44 shown in FIG. 5 having a transverse inlet passage 46, central flow passage 45 and laterally directed outlet passage 49 which in this installation is designed to register with the arcuate outlet port 43 in the valve body element as the core is rotated. The upper end of the core 44A is transversely notched as at 67 and axially slotted as at 68 to provide spaced upstanding ears 69 constituting a guide slot and support for the pivot pin 70. The pin 70 secures the mid-section of an operating lever 71 to the valve core with the inner end of the lever projecting into the arcuate slot 61 in the valve body. The inner end of the lever 71 has a rounded head 72 which slides angularly in the slot as the lever and core are rotated and the ends of the slot limit the rotary motion of the lever and core. As the outer operating end of the lever is raised and lowered, the head 72 slides radially in the slot 61 to accommodate axial motion of the pivot 70. An outer decorative cover cap 73 is fitted over the end of the core and the valve body and provided with a cylindrical flange 74 that is snap fitted over the clamp nut 39A that is beveled at 75 to hold the cap in place. The cap 73 is slotted as at 76 to permit vertical rocking of the lever 71 but rotates on the nut 39A as the lever is rotated.

It will be appreciated that either the first form of the valve body 30 or the second form 30A may be employed in the base fixture 1 or with a separate swing faucet 65 and that either the finger operated knob 54 or the lever 71 may be employed as an operating means for either of the valve installations.

Figure 8:
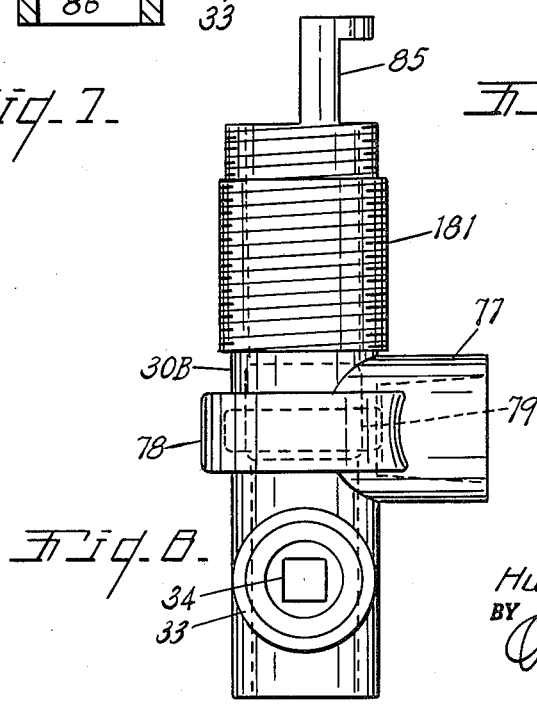
FIG. 8 is a side elevational view of the valve body shown in FIG. 7.

FIGS. 7 and 8 show a variation of the valve body and core adapted for use as a mixing control for a bath shower. The body 30B corresponding to the other tubular valve bodies is provided with the same hot and cold supply connections 32 and 33, but is provided also with an integral laterally opening delivery pipe connection 77 with a radially enlarged annular collar 78 formed around the valve body. The collar 78 and delivery connection 77 define an annular outlet passage 79 which registers with the delivery port 80 in the valve core 81 when the core is adjusted as will be described.

Outwardly from the delivery connection 77, the valve body 30B is provided with a threaded portion 181 of substantial length carrying a rear or inner clamp nut 82 and an outer finished clamp nut and escutcheon ring 83 by means of which the valve body can be clamped in a supporting wall, either the metal wall of a bath fixture or the plaster wall adjacent to a bath tub. The outer end of the valve body is threaded to receive a clamp nut 84 and is provided with the segmental wall 85 the same as the wall 58 in FIG. 2. The valve core 81 projects beyond the end of the valve body and is secured to a manual operating knob 54 by a screw 57 in the same way as in FIGS. 1, 2 and 5.

As in both the other modifications of the valve assembly, the core 81 is provided with a lower or inner O-ring seal 86 which is at all times positioned inwardly of the delivery ports 34 and an upper or outer seal 87 which is at all times positioned above or outwardly of the delivery port 80. The third O-ring seal 88 moves across the annular flow passage 79 to selectively open and close the flow passage. The edges of the anular passage 79 are smoothly beveled so that as the seal 88 moves thereacross it is equally affected by the pressure and smoothly compressed into the tubular bore of the valve body when the valve is closed.

Figure 9:
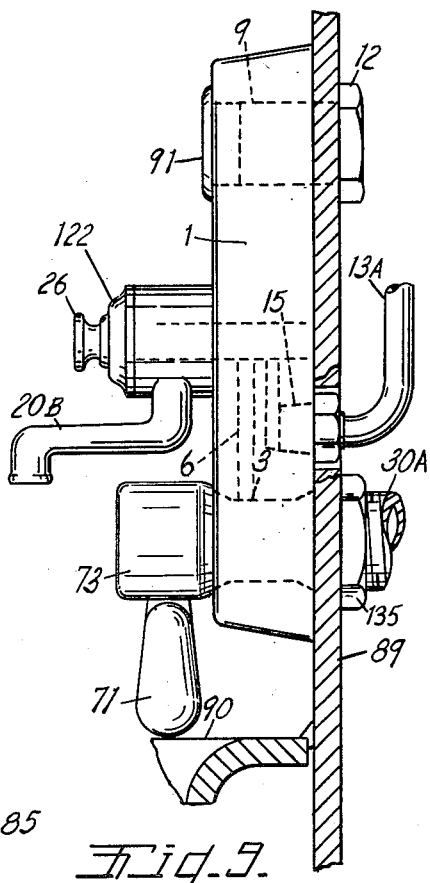
FIG. 9 is a fragmentary side elevational view partially in cross section showing a modified adaptation of the valve and diverter of FIG. 1 as a tub faucet and shower regulator.

FIG. 9 illustrates a modified mounting of the base shown in FIG. 1 connected as a tub and shower control. The base 1 is the same casting as shown in FIG. 1 but is mounted on a vertical wall 89 at the end of a bath tub 90. The lower bore 3 of the base receives and supports the valve body 30A with the clamp nut 135 clamping the base to the wall. The valve body 30A is provided with the operating lever 71 as shown in FIG. 3 and the valve functions to admit selected mixtures of hot and cold water through the flow passage 6. The neck 8 on the base supports the cylindrical end of a tub faucet 20B which in this case is angled outwardly to overhang the tub 90. The diverter valve and its operating knob 26 function to direct the selected water mixture either to the faucet 20B or to a pipe 13A extending upwardly to a shower head not illustrated. The pipe 13A is connected to the diverter connection 15 in place of the spray hose 13 in FIG. 1. The upper bore 9 in the base receives the same tubular nipple 10 as in FIG. 1 with the head 12 of the clamp nut serving to secure the base to the wall 89. Since the port 9 is not used in this installation a finished cover plate 91 is snapped into the front end of the port.

It will be appreciated that the valve body 30 and valve operating knob 54 can be substituted in this installation for the valve 30A and operating lever 71 if desired. The interchangeability of the alternative valve bodies 30 and 30A in the base 1 or directly in a swing faucet 65 and the alternative mounting and connection of the base 1 and diverter valve 23 as a sink faucet and spray installation or as a tub and shower installation greatly reduce the number of parts necessary to meet a wide variety of plumbing installations and therefore reduce the cost of the plumbing fixtures. In all of the alternative installations of the valve and faucet the number of parts is reduced to a minimum and the parts themselves are easily manufactured to the necessary close tolerances to provide effective and long-lived seals and shut-off valves.

Once assembled each form of the valve has two O-ring seals which are permanently and continuously seated against continuous cylindrical surfaces at opposite ends of the valve body to effectively retain the water pressure in the valve and the single intermediate O-ring seal which passes across the delivery opening of the valve body in opening and closing the valve is subjected to uniform pressure completely therearound so as not to be forced into the delivery opening as the valve is opened. The intermediate O-ring seal is compressed smoothly throughout its entire circumference by the tapered end of the annular flow passage around the interior of the valve body at the delivery port. The close fit of the cylindrical valve core in the valve body substantially closes the supply ports when the valve is closed and materially throttles water pressure which might be applied to the lower seal and the intermediate seal. Regardless of the pressure which may be applied to the latter seals, it is balanced axially of the valve core so that there is no tendency for the valve to open accidentally. The water pressure within the valve body is further balanced between the opposite end seals when the valve is open so that the valve core remains in adjusted position and does not tend to shift and vary the flow setting of the valve.

What is claimed as new is:

1. A domestic plumbing fixture comprising an elongated base having three spaced bores formed vertically therethrough with an upstanding neck around the middle bore and tapered seats formed around the ends of another of the bores, said base having a flow passage formed therein between said last two bores and opening between said seats, a downwardly opening spray connection formed in said base and opening laterally to said middle bore in axially spaced relation to said flow passage, a nipple threaded in the bottom of the third of said bores and having a flange adapted to clamp against the underside of a sink panel, a flexible spray tube connected to said spray connection and extending through said nipple and said third bore, a diverter valve consisting of a spool core reciprocably mounted in said middle bore and having axially spaced collars with O-ring seals spaced to selectively seal said bore on opposite sides of said flow passage and opening to said spray connection or on opposite sides of said opening to said spray connection, a third collar and O-ring seal on said core located in said neck, said neck having a delivery port formed therein inwardly of the innermost position of said third seal, said core having separate flow passages formed therein between said seals to open said passage in said base alternatively to said delivery port and said spray tube, a faucet spout sleeved around said neck and having an annular flow passage communicating with said delivery port, a cap on said neck retaining said spout thereon and limiting axial movement of said valve core, a tubular valve body having a cylindrical central portion closely fitted in said other bore in said base with an outwardly projecting shoulder around the lower end of the central portion, said central cylindrical portion of said body being of equal length and diameter to said neck on said base, seals compressed between said tapered seats and said shoulder and a nut threaded on the body above the central portion of the body, said central portion defining a transfer port registering with said flow passage in said base and spaced axially from the shoulder on said central portion by the same distance as the distance of the delivery opening in the neck from the base of the neck, a second clamp nut on the body below said central portion adapted to clamp said valve body and base to a sink panel, supply connections on the lower end of said valve body opening thereinto at oppositely angularly spaced points above the bottom of the body through rectangular supply ports, a cylindrical second core rotatably and reciprocably mounted in said body and closely fitting therein adjacent said supply ports, an O-ring seal around the lower end of said second core below said supply ports, an axial flow passage formed centrally in said second core and opening at its lower end to the surface of the core through a sector shaped passage formed as a cross slot selectively registerable by rotation and axial motion with said supply ports, said second core forming a lateral passage from the upper end of said axial passage registering with said transfer port in said central portion when said sector shaped passage is in registry with either one of said supply ports, a pair of O-ring seals on said second core in spaced relation above said lateral passage to lie on opposite sides of said transfer port in the downward position of the second core, the interior of said body being radically enlarged at said transfer port in said central portion with tapered edges at the ends of the enlargement to form an annular flow passage around the second core, a projection on the upper end of said valve body forming a limit opening, and an operating handle secured to said second core by a screw having a projection engageable in said opening to limit axial and angular motion of said handle and said second core.

2. A domestic plumbing fixture comprising an elongated base having three spaced bores formed vertically therethrough with an upstanding neck around one of the bores and tapered seats formed around the ends of another of the bores, said base having a flow passage formed therein between said last two bores and opening between said seats, a downwardly opening spray connection formed in said base and opening laterally to one of said bores in axially spaced relation to said flow passage, a nipple threaded in the bottom of the third of said bores and having a flange adapted to clamp against the underside of a sink panel, a flexible spray tube connected to said spray connection and extending through said nipple and said third bore, a diverter valve consisting of a core reciprocably mounted in one of said bores and having axially spaced O-ring seals spaced to selectively seal said bore on opposite sides of said flow passage and opening to said spray connection or on opposite sides of said opening to said spray connection, a third O-ring seal on said core located in said neck, said neck having a delivery port formed therein inwardly of the innermost position of said third seal, said core having separate flow passages formed therein between said seals to open said passage in said base alternatively to said delivery port and said spray tube, a faucet spout sleeved around said neck and having an annular flow passage communicating with said delivery port, a cap on said neck retaining said spout thereon and limiting axial movement of said valve core, a tubular valve body having a cylindrical central portion closely fitted in said other bore in said base with an outwardly projecting shoulder around the lower end of the central portion, said central cylindrical portion of said body being of equal length and diameter to said neck on said base, seals compressed between said tapered seats and said shoulder and a nut threaded on the body above the central portion of the body, said central portion defining a transfer port registering with said flow passage in said base and spaced axially from the shoulder on said central portion by the same distance as the distance of the delivery opening in the neck from the base of the neck, a second clamp nut on the body below said central portion adapted to clamp said valve body and base to a sink panel, supply connections on the lower end of said valve body opening thereinto at angularly spaced points above the bottom of the body through supply ports, a cylindrical second core rotatably and reciprocably mounted in said body and closely fitting therein adjacent said supply ports, an O-ring seal around the lower end of said second core below said supply ports, an axial flow passage formed in said second core and opening at its lower end to the surface of the core through a sector shaped passage formed as a cross slot selectively registerable by rotation and axial motion with said supply ports, said second core forming a lateral passage from the upper end of said axial passage registering with said transfer port in said central portion when said sector shaped passage is in registery with either one of said supply ports, a pair of O-ring seals on said second core in spaced relation above said lateral passage to lie on opposite sides of said transfer port in the downward position of the second core, the interior of said body being radially enlarged at said transfer port in said central portion with tapered edges at the ends of the enlargement to form an annular flow passage around the second core, a projection on the upper end of said valve body forming a limit opening, and an operating handle secured to said second core having a projection engageable in said opening to limit axial and angular motion of said handle and said second core.

3. A domestic plumbing fixture comprising an elongated base having three spaced bores formed vertically therethrough with an upstanding neck around one of the bores and tapered seats formed around the ends of another of the bores, said base having a flow passage formed therein between said last two bores and opening between said seats, a downwardly opening delivery connection formed in said base and opening laterally to said one of said bores in axially spaced relation to said flow passage, a nipple threaded in the bottom of the third of said bores and having a flange adapted to clamp against the backside of a supporting panel, a delivery tube connected to said delivery connection and extending therefrom behind said base, a diverter valve consisting of a core reciprocably mounted in said one of said bores and having axially spaced O-ring seals spaced to selectively seal said bore on opposite sides of said flow passage and opening to said delivery connection or on opposite sides of said opening to said delivery connection, a third O-ring seal on said core located in said neck, said neck having a delivery port formed therein inwardly of the innermost position of said third seal and at the same distance from the bottom of said neck as the distance of said flow passage between said seats to the bottom of said base, said core having separate flow passages formed therein between said seals to open said passage in said base alternatively to said delivery port and said delivery tube, a faucet spout sleeved around said neck and having an annular flow passage communicating with said delivery port, the length of said spout measured axially along said neck being approximately equal to the length of said other bore in said base, a cap on said neck retaining said spout thereon and limiting axial movement of said valve core, a tubular valve body having a cylindrical central portion closely fitted in said other bore in said base with an outwardly projecting shoulder around the lower end of the central portion, seals compressed between said tapered seats and said shoulder and a nut threaded on the body above the central portion of the body, said central portion defining a transfer port registering with said flow passage in said base, a second clamp nut on the body below said central portion adapted to clamp said valve body and base to a supporting panel, supply connections on the lower end of said valve body opening thereinto at angularly spaced points above the bottom of the body through supply ports, a cylindrical second core rotatably and reciprocably mounted in said body and closely fitting therein adjacent said supply ports, an O-ring seal around the lower end of said second core below said supply ports, an axial flow passage formed in said second core and opening at its lower end to the surface of the core through a sector shaped passage selectively registerable by rotation and axial motion with said supply ports, said second core forming a lateral passage from the upper end of said axial passage registering with said transfer port in said central portion when said sector shaped passage is in registry with either one of said supply ports, a pair of O-ring seals on said second core in spaced relation above said lateral passage to lie on opposite sides of said transfer port in the downward position of the second core, a projection on the upper end of said valve body forming a limit opening, and an operating handle secured to said second core having a projection engageable in said opening to limit axial and angular motion of said handle and said second core, 4. A domestic plumbing fixture comprising an elongated base having three spaced bores formed vertically therethrough with an upstanding neck around one of the bores and tapered seats formed around the ends of another of the bores, said base having a flow passage formed therein between said last two bores and opening between said seats, a downwardly opening delivery connection formed in said base and opening laterally to said one of said bores in axially spaced relation to said flow passage, a nipple threaded in the bottom of the third of said bores and having a flange adapted to clamp against the backside of a supporting panel, a delivery tube connected to said delivery connection and extending therefrom behind said base, a diverter valve consisting of a core reciprocably mounted in said one of said bores and having axially spaced O-ring seals spaced to selectively seal said bore on opposite sides of said flow passage and opening to said delivery connection or on opposite sides of said opening to said delivery connection, a third O-ring seal on said core located in said neck, said neck having a delivery port formed therein inwardly of the innermost position of said third seal and at the same distance from the bottom of said neck as the distance of said flow passage between said seats to the bottom of said base, said core having separate flow passages formed therein between said seals to open said passage in said base alternatively to said delivery port and said delivery tube, a faucet spout mounted on said neck and having a flow passage communicating with said delivery port, the length of said spout measured axially along said neck being approximately equal to the length of said other bore in said base, a cap on said neck retaining said spout thereon and limiting axial movement of said valve core, a tubular valve body having a cylindrical central portion closely fitted in said other bore in said base with an outwardly projecting shoulder around the lower end of the central portion, seals compressed between said tapered seats and said shoulder and a nut threaded on the body above the central portion of the body, said central portion defining a transfer port registering with said flow passage in said base, a second clamp nut on the body below said central portion adapted to clamp said valve body and base to a supporting panel, supply connections on the lower end of said valve body opening thereinto at angularly spaced points above the bottom of the body through supply ports, a cylindrical second core rotatably and reciprocably mounted in said body and closely fitting therein adjacent said supply ports, an O-ring seal around the lower end of said second core below said supply ports, an axial flow passage formed in said second core and opening at its lower end to the surface of the core through a sector shaped passage selectively registerable by rotation and axial motion with said supply ports, said second core forming a lateral passage from the upper end of said axial passage registering with said transfer port in said central portion when said sector shaped passage is in registry with either one of said supply ports, and a pair of O-ring seals on said second core in spaced relation above said lateral passage to lie on opposite sides of said transfer port in the downward position of the second core.

5. A domestic plumbing fixture comprising an elongated base having spaced bores formed vertically therethrough with an upstanding neck around the top of one of the bores and tapered seats formed around the ends of the other of the bores, said base having a flow passage formed therein between said bores and opening between said seats, a downwardly opening delivery connection formed in said base and opening laterally to said one bore in axially spaced relation to said flow passage, means adapted to clamp said base against a support panel, a delivery tube connected to said delivery connection and extending therefrom behind said base, a diverter valve mounted in said one of said bores to selectively open said flow passage to said delivery connection or to a delivery port formed in the side of said neck located above said base by a distance equal to the distance of the opening of said flow passage to the other of said bores from the bottom of said other bore, a faucet spout sleeved around said neck and having an annular flow passage communicating with said delivery port, a cap on said neck retaining said spout and diverter valve thereon, a tubular valve body having a cylindrical central portion closely fitted in said other bore in said base with an outwardly projecting shoulder around the lower end of the central portion, the length of said central portion being approximately equal to the length of said neck below said cap, seals compressed between said tapered seats and said shoulder and a nut threaded on the body above the central portion of the body, said central portion defining a port registering with said flow passage in said base, a clamp nut on the body below said central portion adapted to clamp said valve body and base to a support panel, supply connections on the lower end of said valve body opening thereinto at angularly spaced points above the bottom of the body through rectangular supply ports, a cylindrical second core rotatably and reciprocably mounted in said body and closely fitting therein adjacent said supply ports, an axial flow passage formed in said second core and selectively registerable by rotation and axial motion with said supply ports and said port registering with said flow passage in said base, a projection on the upper end of said valve body forming a limit opening, and an operating handle secured to said second core by a screw having a projection engageable in said opening to limit axial and angular motion of said handle and said second core.

6. A domestic plumbing fixture comprising an elongated base having spaced bores formed vertically therethrough with an upstanding neck around the top of one of the bores and tapered seats formed around the ends of the other of the bores, said base having a flow passage formed therein between said bores and opening between said seats, a downwardly opening delivery connection formed in said base and opening laterally to said one bore in axially spaced relation to said flow passage, means adapted to clamp said base against a support panel, a diverter valve mounted in said one of said bores to selectively open said flow passage to said delivery connection or to a delivery port formed in the side of said neck located above said base by a distance equal to the distance of the opening of said flow passage to the other of said bores from the bottom of said other bore, a faucet spout sleeved around said neck and having a flow passage communicating with said delivery port, a cap on said neck retaining said spout thereon, a tubular valve body having a cylindrical central portion closely fitted in said other bore in said base with an outwardly projecting shoulder around the lower end of the central portion, the length of said central portion being approximately equal to the length of said neck below said cap, seals compressed between said tapered seats and said shoulder and a nut threaded on the body above the central portion of the body, said central portion defining a port registering with said flow passage in said base, a clamp nut on the body below said central portion adapted to clamp said valve body to a support panel, supply connections on the lower end of said valve body opening thereinto at angularly spaced points above the bottom of the body through rectangular supply ports, a cylindrical second core rotatably and reciprocably mounted in said body and closely fitting therein adjacent said supply ports, an axial flow passage formed in said second core and selectively registerable by rotation and axial motion with said supply ports and said port registering with said flow passage in said base, a projection on the upper end of said valve body forming a limit opening, and an operating handle secured to said second core having a projection engageable in said opening to limit axial and angular motion of said handle and said second core.

7. A domestic plumbing fixture comprising an elongated base having spaced bores formed vertically therethrough with an upstanding neck around the top of one of the bores and tapered seats formed around the ends of the other of the bores, said base having a flow passage formed therein between said bores and opening between said seats, a downwardly opening delivery connection formed in said base and opening laterally to said one bore in axially spaced relation to said flow passage, means adapted to clamp said base against a support panel, a diverter valve mounted in said one of said bores to selectively open said flow passage to said delivery connection or to a delivery port formed in the side of said neck located above said base by a distance equal to the distance of the opening of said flow passage to the other of said bores from the bottom of said other bore, a faucet spout sleeved around said neck and having a flow passage communicating with said delivery port, a cap on said neck retaining said spout thereon, a tubular valve body having a cylindrical central portion closely fitted in said other bore in said base with an outwardly projecting shoulder around the lower end of the central portion, the length of said central portion being approximately equal to the length of said neck below said cap, seals compressed between said tapered seats and said shoulder and a nut threaded on the body above the central portion of the body, said central portion defining a port registering with said flow passage in said base, a clamp nut on the body below said central portion adapted to clamp said valve body to a support panel, supply connections on the lower end of said valve body opening thereinto at angularly spaced points above the bottom of the body through rectangular supply ports, a cylindrical second core rotatably and reciprocably mounted in said body and closely fitting therein adjacent said supply ports, an axial flow passage formed selectively registerable by rotation and axial motion with said supply ports and said port registering with said flow passage in said base, and an operating handle secured to said second core.

8. A valve for a water faucet comprising a tubular element adapted to project through a support and having opposite angularly spaced laterally projecting supply pipe connections spaced from one end of the element and opening into the interior of the element through rectangular inlet ports, a first threaded portion on said element adjacent said inlet ports and having a clamp nut thereon engageable with the back side of a support, an axially facing radial shoulder at the end of said threaded portion adapted to support a sealing gasket, a straight sided cylindrical portion extending from said shoulder and having formed therein a first circular outlet port adapted to register with a flow passage in a support and an angularly elongated outlet adapted to register alternatively with a swing faucet, a second threaded portion formed on said element at the end of said cylindrical portion and having a nut thereon adapted to clamp a second sealing gasket against said support or alternatively against said swing faucet, a segmental wall projecting axially from a sector of said element beyond said second threaded portion and of greater interior radius than the tubular interior of said element, said wall defining a rectangular opening, a valve core rotatably and reciprocably mounted in said tubular element and extending past said inlet ports at the bottom and upwardly alongside of said segmental wall, flow passages formed in said core arranged to register selectively between said inlet ports and said circular outlet port and elongated outlet.

and an operating handle secured to the end of said core by a screw projecting into said rectangular opening to be limited in axial and rotary movement by engagement with the edges of the opening, said core having O-ring seals therearound engaged with the interior of said tubular element outwardly of said inlet and outlet port and outlet in all positions of said core.

9. A valve for a water faucet comprising a tubular element adapted to project through a support and having angularly spaced laterally projecting supply pipe connections spaced from one end of the element and opening into the interior of the element through inlet ports, a first threaded portion on said element adjacent said inlet ports and having a clamp nut thereon engageable with the back side of a support, an axially facing radial shoulder at the end of said threaded portion adapted to support a sealing gasket, a straight sided cylindrical portion extending from said shoulder and having an outlet formed therein adapted to register with a passage, a second threaded portion formed on said element at the end of said cylindrical portion and having a nut thereon adapted to clamp a second sealing gasket against said support or alternatively against a swing faucet, a segmental wall projecting axially from a sector of said element beyond said second threaded portion and of greater interior radius than the tubular interior of said element, said wall defining a rectangular opening, a valve core rotatably and reciprocably mounted in said tubular element and extending past said inlet ports at the bottom and upwardly alongside of said segmental wall, flow passages formed in said core arranged to register selectively between said inlet ports and said outlet, and an operating handle secured to the end of said core and having means projecting into said rectangular opening to be limited in axial and rotary movement by engagement with the edges of the opening, said core having O-ring seals therearound engaged with the interior of said tubular element outwardly of said inlet ports and outlet port and outlet in all positions of said core.

10. A valve for a water faucet comprising a tubular element adapted to project through a support and having angularly spaced laterally projecting supply pipe connections spaced from one end of the element and opening into the interior of the element through inlet ports, a first threaded portion on said element adjacent said inlet ports and having a clamp nut thereon engageable with the back side of a support, an axially facing radial shoulder at the end of said threaded portion adapted to support a sealing gasket, an upper clamp nut removably threaded on the top of said threaded portion, a straight sided portion extending from said shoulder and having an outlet formed therein adapted to register with a passage, a second threaded portion formed on said element at the end of said straight sided portion and having a nut thereon adapted to clamp against a swing faucet, a segmental wall projecting axially from a sector of said element, said wall defining a rectangular opening, a valve core rotatably and reciprocably mounted in said tubular element and extending past said inlet ports at the bottom and upwardly alongside of said segmental wall, flow passages formed in said core arranged to register selectively between said inlet ports and said outlet, and an operating handle secured to the end of said core and having means projecting into said rectangular opening to be limited in axial and rotary movement by engagement with the edges of the opening, said core having O-ring seals therearound engaged with the interior of said tubular element outwardly of said inlet ports and outlet port and outlet in all positions of said core.

11. A valve as defined in claim 10 in which said handle is an inverted cup shaped cap with the projecting means formed by a screw passed transversely through the cap and core and projecting into said rectangular opening.

12. A valve as defined in claim 10 in which said operating handle is a lever pinned intermediate of its ends in a vertical slot in the top of said core and having a rounded inner end vertically engaged in said rectangular opening and angularly slidable in the opening.

13. A valve as defined in claim 10 in which said operating handle is a lever pinned intermediate of its ends by a horizontal pivot to the top of said core and having a rounded inner end vertically engaged in said rectangular opening and angularly slidable in the opening.

14. A valve for a water faucet comprising a tubular element adapted to project through a support and having angularly spaced laterally projecting supply pipe connections spaced from one end of the element and opening into the interior of the element through inlet ports, a first threaded portion on said element adjacent said inlet ports and having a clamp nut thereon engageable with the back side of a support, an axially facing radial shoulder at the end of said threaded portion adapted to support a sealing gasket, a straight sided portion extending from said shoulder and having formed therein an outlet port adapted to register with a flow passage in a support and an angularly elongated outlet adapted to register alternatively with a swing faucet, a second threaded portion formed on said element at the end of said straight sided portion and having a second nut thereon adapted to clamp a second sealing gasket against said support or alternatively against said swing faucet, a third nut removably threaded on said first threaded portion in opposition to said first nut and having a finished outer surface, a valve core rotatably and reciprocably mounted in said tubular element and extending past said inlet ports and said outlet port and elongated outlet, flow passages formed in said core arranged to register selectively between said inlet ports and said outlet port and elongated outlet, and an operating handle secured to the end of said core and having a cover portion overhanging the end of said element and said second nut.

15. A faucet mounting comprising a base having a flat back edge adapted to be positioned against a support, a first bore formed through said base from front to back and having tapered seats at its ends, a second bore formed through said base in spaced relation to said first bore and having a neck formed around the second bore and projecting beyond the front of the base, said base having a flow passage opening between the mid-sections of said first and second bores, a delivery port formed in the side of said neck to said second bore and located outwardly from the bottom of said neck by the same distance as the distance of said flow passage from the back of said first bore, an alternate delivery port formed in said base to said second bore at the opposite side of said flow passage, a connection on the back of said base for a diverted flow conduit, a reciprocable valve core in said second bore having annular end seals reciprocable in said second bore and an intermediate annular seal movable to opposite sides of said flow passage,
a faucet having a neck swivally mounted around the neck on said base and sealed thereto on opposite sides of said first delivery port in said neck,
a cap threaded on said neck and retaining said faucet and valve in place,
an operating knob on said valve projecting through said cap,
a third bore formed through said base on the opposite side of said second bore from said first bore,
an annular clamp nut threadedly engaged with said base around the rear end of said third tubular bore and adapted to clamp the base to a supporting panel,
a valve body having a cylindrical portion clamped in said first bore with a delivery passage opening to said flow passage in said base,
seals clamped against said seats around said valve body,
supply connections on said body and opening thereinto behind said base,
a second clamp nut on said body engageable with the rear of said support panel,
and a valve core in said valve body having a flow passage formed therein movable into selective registry with said supply connections and said delivery passage,
said core having an operating handle on its outer end having motion limiting connections to said valve body.

16. A faucet mounting comprising a base having a flat back edge adapted to be positioned against a support,
a first bore formed through said base from front to back and having tapered seats at its ends,
a second bore formed through said base in spaced relation to said first bore and having a neck formed around the second bore and projecting beyond the front of the base,
said base having a flow passage opening between the mid-sections of said first and second bores,
a delivery port formed in the side of said neck to said second bore and located outwardly from the bottom of said neck by the same distance as the distance of said flow passage from the back of said first bore,
an alternate delivery port formed in said base to said second bore at the opposite side of said flow passage,
a connection on the back of said base for a diverted flow conduit,
a reciprocable valve core in said second bore having annular end seals reciprocable in said second bore and an intermediate annular seal movable to opposite sides of said flow passage,
a faucet having a neck mounted around the neck on said base and sealed thereto on opposite sides of said first delivery port in said neck,
a cap threaded on said neck and retaining said faucet and valve in place,
an operating knob on said valve projecting through said cap,
a third bore formed through said base,
an annular clamp nut threadedly engaged with said base around the rear end of said third tubular bore and adapted to clamp the base to a supporting panel,
a valve body having a cylindrical portion clamped in said first bore with a delivery passage opening to said flow passage in said base,
seals clamped against said seats around said valve body,
supply connections carried by said body and opening thereinto behind said base,
means on the rear of said body engageable with the rear of said support panel,
and a valve core in said valve body having a flow passage formed therein movable into selective registry with said supply connections and said delivery passage,
said core having an operating handle on its outer end having motion limiting connections to said valve body.

References Cited in the file of this patent
UNITED STATES PATENTS

| | | |
|---|---|---|
| 2,519,158 | Symmons | Aug. 15, 1950 |
| 2,633,324 | Bierman | Mar. 31, 1953 |
| 2,684,691 | Strickler | July 27, 1954 |
| 2,725,896 | Barker | Dec. 6, 1955 |
| 2,747,604 | Fraser | May 29, 1956 |
| 2,839,039 | Wolf | June 17, 1958 |
| 2,851,057 | Fraser | Sept. 9, 1958 |
| 2,870,790 | Jordan | Jan. 27, 1959 |
| 2,924,243 | Cordova | Feb. 9, 1960 |
| 2,977,988 | Drobilits et al. | Apr. 4, 1961 |
| 2,992,657 | Weddendorf | July 18, 1961 |